United States Patent [19]
Padgett

[11] 3,777,923
[45] Dec. 11, 1973

[54] PALLET REMOVING TRUCK

[75] Inventor: Freeman Padgett, Jacksonville, Fla.

[73] Assignee: Ronnie Freeman Padgett, Jacksonville, Fla. ; a part interest

[22] Filed: Dec. 23, 1970

[21] Appl. No.: 101,047

Related U.S. Application Data

[63] Continuation-in-part of Ser. No. 789,287, Jan. 6, 1969, abandoned.

[52] U.S. Cl............. 214/506, 214/750, 280/47.27, 214/372
[51] Int. Cl................................................ B60p 1/04
[58] Field of Search.............. 214/370, 384, 75 T, 214/75 H, 350, 515, 517, 372; 280/47.27, 47.28, 47.29, 47.24; 254/8, 113

[56] References Cited
UNITED STATES PATENTS

| | | | |
|---|---|---|---|
| 2,420,001 | 5/1947 | McCollum | 214/350 |
| 2,721,668 | 10/1955 | Elsner | 280/47.27 X |
| 1,517,951 | 12/1924 | Cade | 280/47.27 |
| 3,257,018 | 6/1966 | Miles | 214/370 |
| 2,659,506 | 11/1953 | Watkins | 214/750 |
| 3,045,851 | 7/1962 | Rupert | 280/47.24 X |
| 3,038,622 | 6/1962 | Quale | 214/370 X |
| 2,827,190 | 3/1958 | Spitzmesser | 280/47.24 X |

Primary Examiner—Albert J. Makay
Attorney—Allan M. Lowe et al.

[57] ABSTRACT

A truck for unloading freight on pallets or skids from a tractor trailer, or the like, includes a pair of horizontally extending forks, having upwardly extending teeth for gripping the skid or pallet wooden bottom. The forks are pivotable about a common axis, on which are mounted two sets of dual wheels. Extending from the axis, in a generally upward direction, are arms joined by a transverse strut carrying a shackle. The upwardly extending teeth on the horizontally extending forks are selectively removable so that they can be replaced as they wear.

14 Claims, 15 Drawing Figures

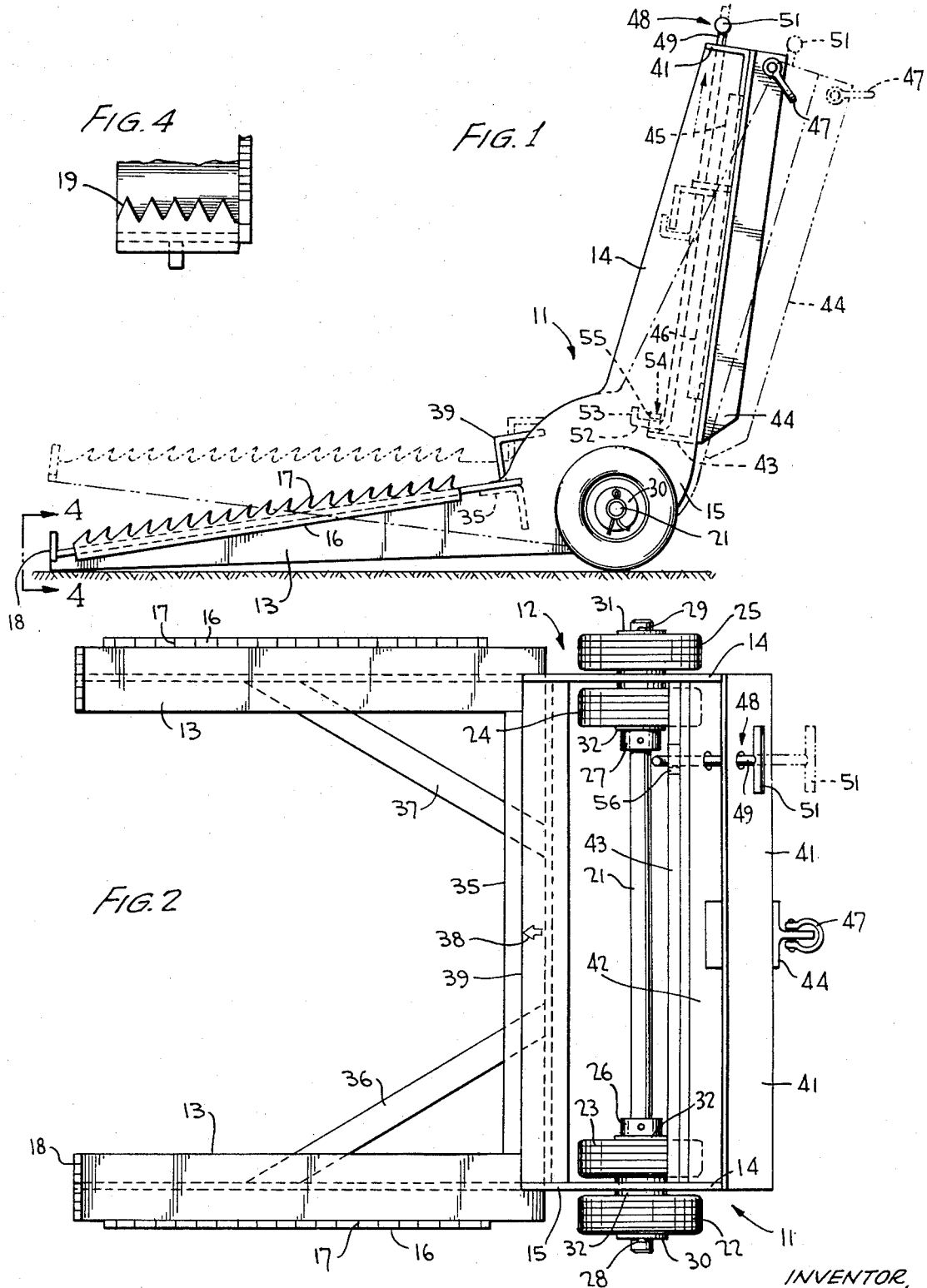

INVENTOR,
FREEMAN PADGETT
BY Lowe & King ATTORNEYS

PATENTED DEC 11 1973  3,777,923
SHEET 3 OF 3
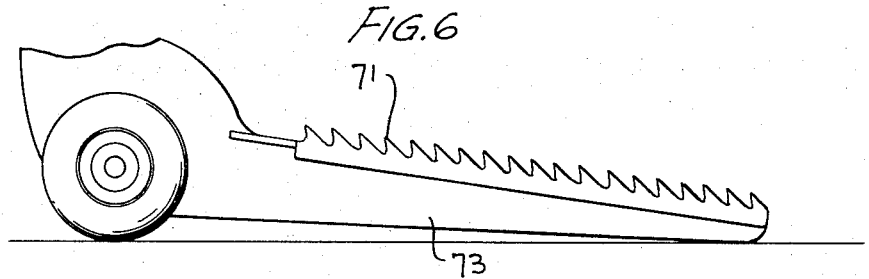
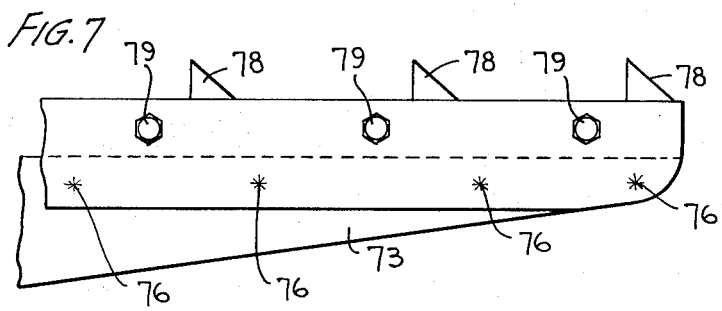 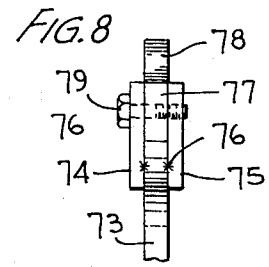
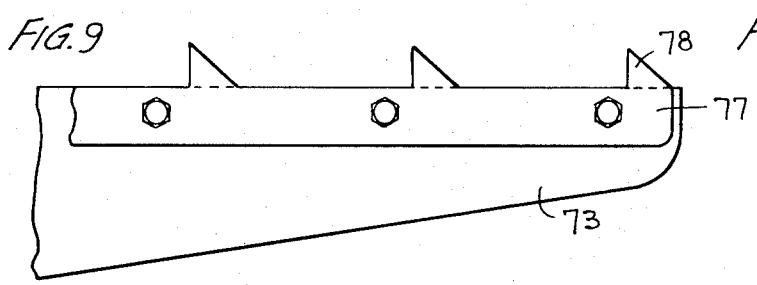 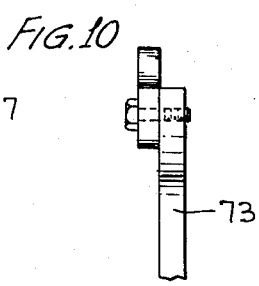
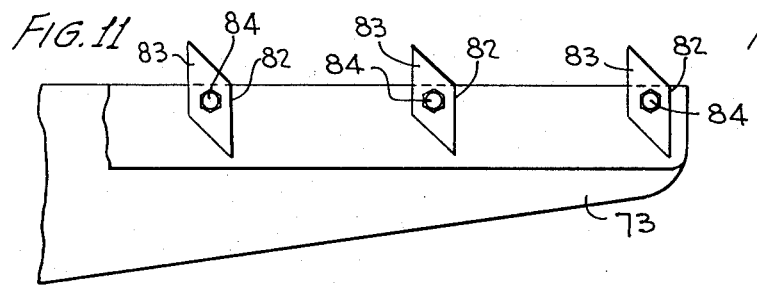 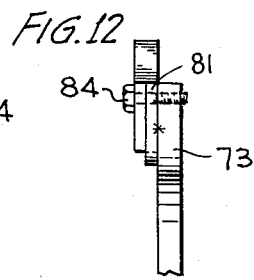
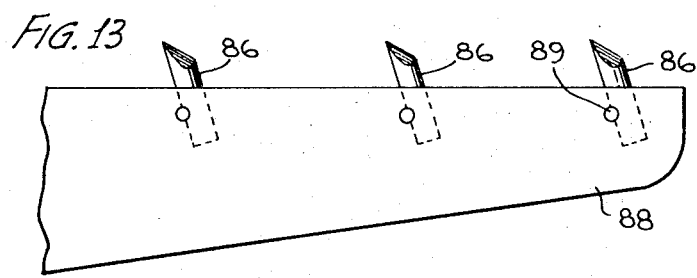 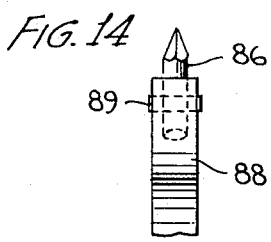
INVENTOR,
FREEMAN PADGETT
BY
Lowe & King
ATTORNEYS

PALLET REMOVING TRUCK

This application is a continuation-in-part of my co-pending application, Ser. No. 789,287, filed Jan. 6, 1969, now abandoned entitled "Pallet Removing Truck."

The present invention relates generally to trucks and, more particularly, to a truck including a plurality of forks having upwardly extending teeth for gripping a wooden pallet or skid.

The modular shipping of freight on wooden pallets, or skids, has received wide acceptance because large quantities of material can be packaged together, without requiring handling of individual items. The use of pallets has reduced the space requirements of freight on a carrier vehicle, such as the trailer of a tractor trailer, because the pallets can be closely loaded together by motorized fork-lift trucks that can run from a shipping dock into the interior of the carrier vehicle. The savings in time, manpower, and, therefore, money, resulting from the use of pallets for shipping freight has been appreciable.

One problem, however, that truckers and consignees of modular freight in palletized form have encountered is difficulty in removing the pallet from the interior of the carrier vehicle. At many facilities receiving palletized freight, there is no fork-lift truck which can be driven into the carrier vehicle interior. The problem occurs particularly at facilities where the consignee does not have an unloading dock, or has a fork-lift truck with a height greater than the access opening of the carrier vehicle. In addition, there are various types of carrier trucks having an access opening of nonstandard height above ground making them unadaptable for unloading from conventional docks.

For these reasons, it is necessary at certain consignee facilities for laborers to assist in physically unloading pallets or skids from a carrier vehicle. The general procedure has been for laborers to utilize various devices, such as prybars, to lift a corner of the pallet away from the vehicle floor sufficiently to slip a chain under a pallet corner. The chain is generally pulled by a mechanized source to drag the pallet across the floor of the carrier vehicle. In addition to being time consuming, expensive and inconvenient, this procedure has often caused the pallet being removed to shift laterally across the vehicle into engagement with another pallet, causing damage to the goods loaded on either or both of the pallets.

In certain instances, it is difficult, and occasionally impossible, to slip a chain under a corner of the pallet to enable it to be removed from the carrier vehicle. In such an instance, the freight loaded on the pallet must be removed, piece by piece, with a hand truck or by hand if no hand truck is available. Of course, the removal of freight from a pallet or skid by hand completely obviates the advantages of the modular freight concept and actually results in added cost to the consignee and carrier.

In accordance with the present invention, a truck for removing pallets from a carrier vehicle, at any facility, is provided. The truck includes a pair of generally horizontally extending forks, having upwardly extending gripping teeth thereon for engaging the lower surface of a pallet. Two sets of teeth are provided on each fork, one running longitudinally of the fork, and the other set being at the end of the fork extending at right angles to the fork length. The fork is mounted to be rotatable about an axis remote from the transverse teeth, and coaxial with two sets of dual wheels. Fixedly mounted to the forks and extending in a generally upwardly direction are arms, carrying at the ends thereof a shackle adapted to be engaged by a tow rope attached to a motive source.

The teeth on the fork grip the lower wooden surface of the pallet in response to a force being applied to the truck by the motive source. The gripping forces of the teeth against the wooden surface of the pallet are such that the pallet is generally lifted from the trailer floor, even though the forks have a length less than one-half of the length of a pallet being lifted. Hence, there is no concern with the relative size and center of gravity of a pallet being removed from the carrier vehicle relative to the length of the lifting forks.

It has been found through actual use, that the teeth on the forks have a tendency to wear with use. Frequently, the teeth wear to such an extent that they are no longer operative to lift a pallet effectively. To obviate this problem, in accordance with another feature of the invention, the teeth on the fork can be selectively removed so that they can be replaced when worn.

The truck of the present invention is sufficiently small to be stowed on vehicle trailers and is of low enough cost to enable all trucks handling heavy loads to be equipped with one of them. In particular, a typical truck has forks of approximately 20 inches in length and upwardly extending arms reaching to a height of approximately 24 inches.

A further feature of the present invention is an extensible handle mounted in the upwardly extending arms. The handle is adapted to be gripped by personnel utilizing the truck to facilitate insertion of the truck beneath a pallet.

Still another feature of the invention is a centrally located guide, approximately equally spaced between the two forks. The guide enables an operator to insert the forks at an equal distance from a center wooden plank of the skid. By locating the forks equally from the center of the skid, any problems of tipping and load shifting that might arise are obviated.

It is, accordingly, an object of the present invention to provide a new and improved truck for facilitating the removal of palletized freight from a vehicle, regardless of the facility at which the vehicle is located.

Another object of the present invention is to provide a truck for enabling palletized freight to be removed from a vehicle, even though the vehicle is located at a facility which does not have a suitable fork lift truck or dock for removing pallets.

Another object of th present invention is to provide a truck particularly adapted for removing palletized freight from a vehicle, which truck is small and inexpensive enough to be carried on a vehicle.

Still another object of the present invention is to provide a truck adapted for removing palletized freight from a vehicle at any facility, to reduce labor expenses and damage relative to prior art techniques.

Still another object of the present invention is to provide a truck particularly adaptable for carrying pallets from a carrier vehicle, regardless of the relative pallet and truck size, without danger of pallet tipping.

Yet another object of the present invention is to provide a truck particularly adaptable for carrying pallets from a carrier vehicle, which truck includes teeth susceptible to wear and which can be replaced at will.

The above and still further objects, features and advantages of the present invention will become apparent upon consideration of the following detailed description of several specific embodiments thereof, especially when taken in conjunction with the accompanying drawings, wherein:

FIG. 1 is a side view of a preferred embodiment of the present invention;

FIG. 2 is a top view of the truck shown in FIG. 1;

FIG. 4 is a front view of a portion of the truck shown in FIG. 1, taken along the line 4—4;

FIG. 6 is a fragmentary view of the bottom portion of the truck;

FIGS. 7–14 are side and end views of different structures which can be employed for enabling teeth on forks of the truck to be removed and replaced at will; and FIG. 15 is a perspective view of modification of the embodiment of FIGS. 13 and 14.

Figure 3:
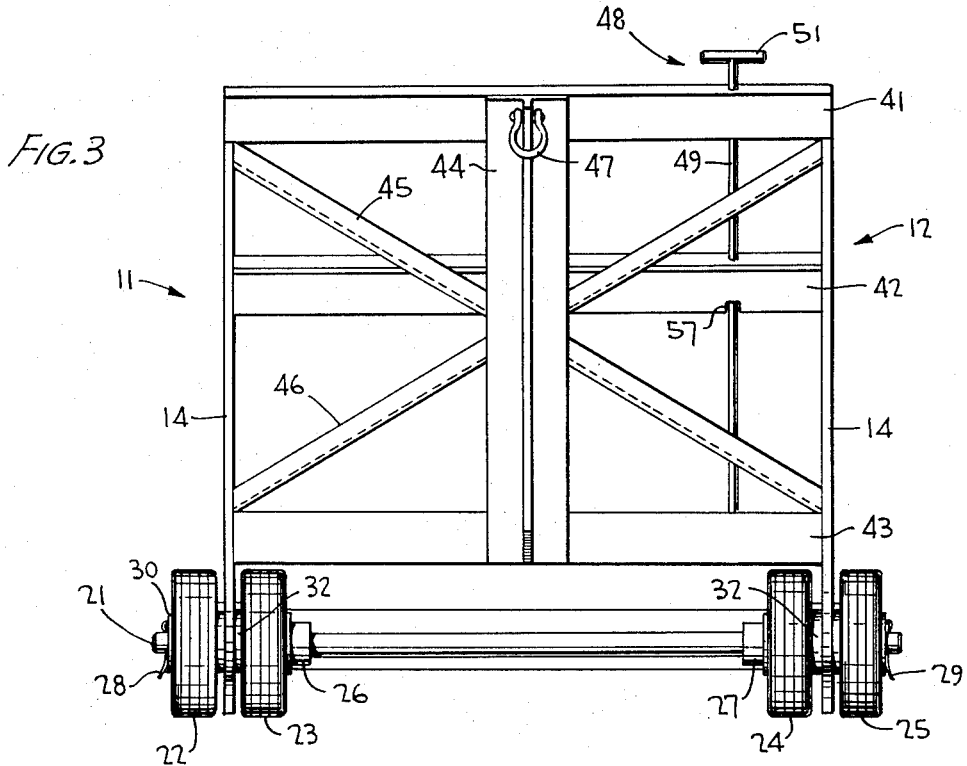
FIG. 3 is a back view of the truck shown in FIG. 1.

Reference is now made to FIGS. 1–4 of the drawings wherein a preferred embodiment of the truck of the present invention is illustrated as comprising a pair of side panels 11 and 12. Panels 11 and 12 are essentially identical so that a description of panel 11 suffices for panel 12. Panel 11 includes a generally horizontally extending fork 13 adapted to engage the bottom of wooden planks of a pallet or skid carrying freight. Upwardly extending from fork 13 is arm 14, an integral part of the fork and joined therewith by fixed, nonrotatable elbow 15.

Fork 13 is of generally T-shaped cross section, with the leg of the T downwardly depending from the generally horizontally extending arms, while arm 14 and hump 15 are essentially planar. Upwardly extending from the outer edge of fork 13 is flange 16 having teeth 17 cut therein. Teeth 17 are pitched so that the angle of pitch is directed toward arm 14 and hump 15. At the front edge of fork 13 is transverse ear 18 having teeth 19 cut therein so that the teeth extend across the width of the T arms comprising fork 13. Teeth 17 and 19 engage and dig into the bottom, wooden surfaces of skids to enable skids weighing as much as 4,000 pounds to be lifted from a trailer floor in response to rotation of the truck about an axis about which forks 13 and arms 14 rotate. Teeth 17 extend above the upper surface of flange 16 by approximately one-half inch, a distance sufficiently short to prevent them from contacting and damaging a load on a pallet. If a single long tooth were provided on each of forks 13 to attain the required effect, rather than a multiplicity of relatively short teeth, there would be a fairly high probability of the long tooth passing completely through the pallet into the material carried by the pallet with resulting detrimental effects.

The rotational axis of the truck common to fork 13 and arm 14 coincides with axle 21 that extends through elbows 15 at a point approximately at the ends of the fork and arm. Axle 21 extends through suitable apertures in side frames 11 and 12 and carries two sets of dual wheels 22–25. Dual wheels 22 and 23 are mounted on the outside and inside of side frame 11, while wheels 24 and 25 are mounted on the inside and outside of side frame 12. Wheels 22–25 are maintained in situ by hubs 26 and 27, on the inside wheels, and cotter pins 28 and 29, which engage hubs 31 and 32 on the outer wheels 22 and 25, respectively. Bearings 33 support the load of wheels 22–25 on axle 21. The dual wheel construction has been found most advantageous in supporting a pallet load because of the relatively large contact area between the wheels and a supporting floor. If the load is not equally distributed between the horizontally extending forks 13 of side panels 11 and 12, the dual wheel arrangement, on either side of the side frames, has been found adequate generally to prevent tipping.

To provide rigidity to forks 13 on side panels 11 and 12, the forks are connected together by transverse angle iron strut 35, the upper surface of which is welded to the lower surfaces of the inside T arms of forks 13. Additional rigidity between the two side panel forks 13 is provided by angle irons 36 and 37, diagonal struts welded between the lower surfaces of the T-arms comprising fork 13 and transverse strut 35. It has been found that by welding angle irons 36 and 37 so they engage forks 13 slightly forward of the midway point of the forks and approximately one-third of the way across transverse strut 35, sufficient rigidity is provided to the truck to enable it to lift loads of approximately two tons.

To enable forks 13 to be inserted under a pallet equidistant from the pallet center, a guide in the form of arrows 38 is provided at a point centrally located between the side panel forks 13 on strut 35. In use, the truck of the present invention is slid underneath a pallet so that guide 38 is essentially coincident with a centrally located plank of the pallet. Thereby, equalization of the pallet load on forks 13 is assured further to reduce the possibility of tipping.

To provide a stop for the vertical wall of pallets being placed on the truck, angle iron 39 is provided and extends between elbow portion 15 of side panels 11 and 12. The ends of angle iron 39 are fixedly secured by welding to side panels 11 and 12. The downwardly extending portion of angle iron 39 is substantially at right angles to the upper surfaces of the T arms of side panel forks 13 and the ends of the angle iron arms are in contact with the forks. As a load is lifted by forks 13 in response to rotation of the truck about axle 21, the motion of the pallet is limited so that the pallet does not move beyond the vertical front surface of angle iron 39 and cannot slide into upwardly extending arms 14.

Arms 14 on side panels 11 and 12 are rigidly connected by transversely extending angle irons 41, 42 and 43, extending between the top, central and lower portions of arms 14 and welded thereto. Additional rigidity to the truck is provided by vertically extending T cross-sectioned iron 44, which bisects arms 41–43 and is welded thereto. Further rigidity to the truck is provided by diagonally extending struts 45 and 46, angle irons which form cross arms that are welded to side panel arms 14, cross arms 41–43, and vertical arm 44.

To enable the truck to be secured to a tow rope, or the like, shackle 47 is rotatably mounted in an aperture at the upper end of vertically extending arm 44. In response to a force exerted by a tow rope, which can be connected to a suitable motive source, such as a fork lift or pick-up truck, hand winch, battery powered winch or gasoline powered winch, the truck is rotated about axle 21 so that teeth 17 and 18 on side panel forks 13 engage the lower surfaces of wooden planks comprising the floor of a pallet.

To enable the truck of the present invention to be wheeled into place in a facile manner, without an operator having to bend to the relatively low upper surface of arm 14, which is approximately two feet above the ground, extensible handle 48 is provided. Handle 48 comprises a vertically extending rod 48 having a horizontally extending gripping cylinder 51 welded to the top thereof. Rod 49 extends through circular apertures in transverse angle irons 41 and 42 and includes a horizontally extending crook 52 having an upwardly extending finger 53 at its end. In the unextended position, wherein cylinder 51 is proximate transverse strut 41, dog 54, mounted on the upper surface of transverse strut 43, holds crook 52 in situ. Dog 54 is a finger-like extension from strut 43, including an upwardly extending section 55 at the end of which is horizontally extending segment 56.

To wheel the truck of the present invention into place so that forks 13 are beneath a pallet, extensible handle 48 is rotated clockwise, as seen in FIG. 2, so that the longitudinal axis of cylinder 51 is directed parallel with the length of side panel forks 13. The extensible handle is then lifted and rotated 90 degrees in the counterclockwise direction so that finger 53 and crook 52 engage slot 47 in the lower surface of strut 42. It has been found that this particular type of handle facilitates greatly the positioning of the truck beneath the planks of the pallet. After the truck is positioned beneath the pallet planks, the handle is stowed in the usual position, shown in FIG. 1, and a tow line is secured to shackle 47.

Figure 5:
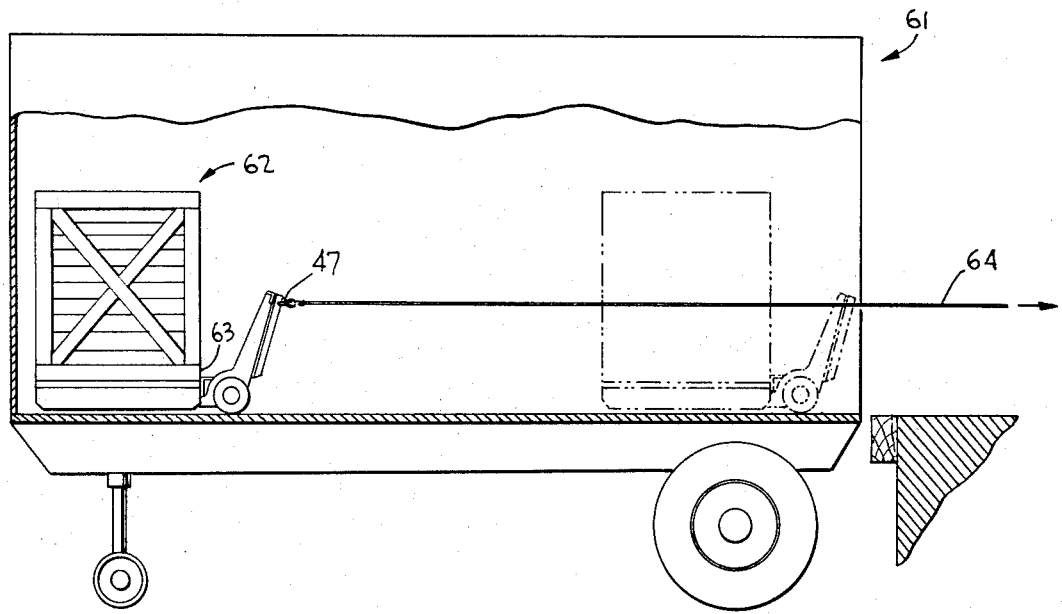
FIG. 5 is a view illustrating the manner by which the truck of the present invention is utilized for removing pallets from a tractor trailer.

As shown in FIG. 5, the truck of the present invention is particularly adapted for use in removing loaded pallets from a carrier vehicle, such as tractor trailer 61. The truck is wheeled into position so that guide 38 on transverse strut 35 is approximately aligned with a centrally extending plank beneath pallet 62. The truck is wheeled into position beneath the floor of pallet 62 so that vertical surface 63 of the pallet comes into contact with the intersection of the lower edge of stop 39 with the upper edge of forks 13, as shown in FIG. 1. The forks need not extend to the center of pallet 62, which typically have a length on the order of four to six feet. Instead, side panel forks 13, which have a length of approximately 18 inches, need merely to be positioned so that teeth 17 and 19 thereof can come into engagement with the underneath side of the wooden floor comprising pallet 62.

One end of tow rope 64 is then secured to shackle 47. At the other end of the tow rope a suitable motive force of the type specified supra is provided to rotate the truck about axle 21, as shown by dotted lines in FIG. 1, so that teeth 17 and 19 engage the bottom wooden flooring of pallet 62. As shown in FIG. 1, there is approximately a 23 degree rotation of side panel forks 13 about axle 21 so that teeth 17 and 19 securely grip into the underneath side of the pallet flooring to prevent shifting of the pallet. The motive force is then applied to tow rope 64 to translate pallet or skid 62 to the rear of tractor trailer 61, as shown by dotted lines in FIG. 5.

Generally, the entire weight of skid 62 will be lifted by the truck to reduce materially the frictional effects of the skid in sliding across the floor of trailer 61. For certain dimensions and weights of skid 62, however, the truck will not completely lift the end of the skid remote from the truck, but will drag it across the tractor trailer floor. Dragging of the skid by the truck is not particularly detrimental because of the gripping effect of teeth 17 and 19 against the bottom flooring of skid 62 to prevent substantial lateral translation of the skid once it has been gripped. Thereby, the possibility of damage to other skids loaded on trailer 61 is virtually obviated, regardless of the weight of the load on the skid.

After skid 62 has been translated to the rear, open end of trailer 61, the truck is rotated in a counterclockwise direction, as seen in FIG. 5, so that the skid is returned to the floor of the trailer. Once pallet 62 has been brought to the open end of the truck, the contents thereof can generally be removed by a fork-lift truck or other suitable means generally located at the facility of a consignee.

In the embodiment of FIGS. 1-4, flange 16 carrying teeth 17 is integral with fork 13. In actual use, it has been found that teeth 17 have a tendency to wear, and after a relatively long period of use are worn to such an extent that they become ineffective. To solve this problem, the integral teeth 17 of FIGS. 1-4 are replaced by selectively removable tooth assembly 71, FIG. 6, which can take one of a multiplicity of forms, four of which are illustrated in FIGS. 7-14. In the modifications illustrated by FIGS. 6-14, assembly 71 is mounted on fork 73, having approximately the same length and sloping top surface as forks 13, but which has a width considerably less than the width of forks 13. Assembly 71 is mounted on the upper, sloping edge of fork 73.

In the configuration illustrated in FIGS. 7 and 8, fork 73 carries a pair of longitudinally extending bars 74 and 75, which are welded to the fork in proximity to the upper edge of the fork, as illustrated by welding spots 76. Bars 74 and 75 extend above the upper surface of fork 73, to form a channel or slot for receiving longitudinally extending rack 77. Integral with and extending from the upper surface of rack 77 are teeth 78, having a vertical extent on the order of one-half inch and a pitch similar to that of teeth 17, i.e., directed toward arms 14. Bars 74 and 75 and rack 77 have mating circular apertures through which bolts 79 extend. Bolts 79 are threaded at their ends to engage threads in bar 75 to form a fastener for enabling rack 77 to be removed at will when teeth 78 are worn. It is to be understood that the welded construction of bars 74 and 75 on fork 73 illustrated by FIGS. 7 and 8 can be replaced with a cast or molded structure. Rack 77 can also be mounted on one side of fork 73, as illustrated in FIGS. 9 and 10. The construction of FIGS. 7 and 8, however, is preferable to that of FIGS. 9 and 10 because of the greater rigidity provided by the opposing faces of bars 74 and 75 on opposite faces of rack 77.

In certain instances, there is a tendency for individual teeth to wear at a faster rate than other teeth on the forks 73. In such an instance, it is desirable to selectively remove only one tooth at a time, rather than a complete assembly of teeth, as in the embodiments of FIGS. 7-10. To these ends, the embodiments of FIGS. 11-14 are provided.

In the embodiment of FIG. 11, slotted bar 81 is fixedly secured, by welding, to fork 73 so that the upper edge of bar 81 is substantially aligned with the upper edge of the fork. Bar 81 includes a multiplicity of trapezoidal slots 82 having vertically extending longitudinal axes. Slots 82 are dimensioned and shaped to receive teeth 83, that are shaped in the form of a parallelogram. Teeth 83 fit into slots 82 so that the entire edge of the teeth in contact with the front edge of each slot, i.e., the edge farthest away from axle 21, is in the slot. Teeth 83, bar 81 and fork 73 have mating circular apertures into which fastening bolts 84 are screwed. Any tendency for teeth 83 to pivot about an axis formed by bolt 84 is obviated by the approximately one inch vertical extent of each tooth along the front edge of each slot 82. Teeth 83 extend above the upper edge of bar 81 and fork 73 by approximately one-half inch so that the possibility of the teeth extending through a wooden pallet into the material on the pallet is avoided. A particular advantage of the construction illustrated by FIGS. 11 and 12 is that the teeth 83, when worn on one side, can be reversed in position so that both the top and bottom segments thereof can be utilized for gripping purposes.

In accordance with still another embodiment of the invention, the replaceable teeth are formed as cylindrical pins 86, as illustrated in FIGS. 13 and 14. Pins 86 can include a sheared point, as illustrated in FIGS. 13 and 14. In the alternative, the pins 86 of FIGS. 13 and 14 can be replaced by a turned point pin 87, as illustrated in FIG. 15. Pins 86 or 87 are carried by fork 88, as illustrated in FIGS. 13 and 14 so that they extend approximately one-half inch above the upper surface of the fork. Fork 88 has a width sufficiently great to enable a multiplicity of bores having generally, vertically extending longitudinal axes to be formed therein. The bores in fork 88 have a slight inclination toward the end of the fork from arms 14 so that pins 86 or 87 point in a direction towards the arms. The pins mate with the bores into which they are inserted in such a manner that semicircular notches on one edge thereof are positioned closer to arms 14 than to the end of the forks remote from the arms. The semicircular notches in pins 86 and 87 mate with circular apertures in the side walls of forks 88. Dowels 89 are inserted through the apertures of fork 88 and notches in pins 86 or 87 to lock the tooth in situ on the fork.

While there have been described and illustrated several specific embodiments of the invention, it will be clear that variations in the details of the embodiments specifically illustrated and described may be made without departing from the true spirit and scope of the invention as defined in the appended claims.

I claim:

1. A truck for enabling wooden pallets or the like to be translated comprising a pair of generally horizontally extending, spaced forks, generally upwardly extending arms fixedly secured to the horizontally extending forks, means for enabling said forks and arms to be rotated about a common pivot axis proximate the ends of said arms, wheel means mounted coaxially with said axis, a multiplicity of upwardly extending teeth running along a substantial length of said forks, said teeth being pitched toward said arms and having edges to engage and dig into the lower horizontally extending surface of a pallet as the truck is rotated about the axis in response to a horizontally directed force being applied to said upwardly extending arms, said teeth having a length less than the thickness of boards in the pallet, and another set of upwardly extending teeth on each of said forks, each of said another set of teeth extending transversely to the teeth running the length of the forks and being positioned at the ends thereof remote from the axis.

2. The truck of claim 1 further including a handle extensibly mounted relative to said arms.

3. The truck of claim 2 wherein said wheel means comprises a set of dual wheels for each of said forks.

4. The truck of claim 3 further including a stop extending between said forks, said stop being located approximately at the ends of said teeth.

5. The truck of claim 4 further including a guide equispaced between said forks.

6. A truck for enabling wooden pallets or the like to be translated comprising a pair of generally horizontally extending, spaced forks, generally upwardly extending arms fixedly secured to the horizontally extending forks, means for enabling said forks and arms to be rotated about a common pivot axis proximate the ends of said arms, wheel means mounted coaxially with said axis, a multiplicity of upwardly extending teeth running along a substantial length of said forks, said teeth being pitched toward said arms and having edges to engage and dig into the lower horizontally extending surface of a pallet as the truck is rotated about the axis in response to a horizontally directed force being applied to said upwardly extending arms, said teeth having a length less than the thickness of boards in the pallet, and a stop extending between said forks, said stop being located approximately at the ends of said teeth and extending between said arms, said stop having a downwardly extending portion substantially at right angles to the upper surfaces of the forks, and a substantially horizontally extending portion fixedly connected to said arms, said downwardly extending portion being located between said arms and the teeth.

7. The truck of claim 4 further including a guide equispaced between said forks.

8. A truck for enabling wooden pallets or the like to be translated comprising a pair of generally horizontally extending, spaced forks, generally upwardly extending arms fixedly secured to the horizontally extending forks, means for enabling said forks and arms to be rotated about a common pivot axis proximate the ends of said arms, wheel means mounted coaxially with said axis, a multiplicity of upwardly extending teeth running along a substantial length of said forks, said teeth being pitched toward said arms and having edges to engage and dig into the lower horizontally extending surface of a pallet as the truck is rotated about the axis in response to a horizontally directed force being applied to said upwardly extending arms, said teeth having a length less than the thickness of boards in the pallet, and fastener means for enabling said teeth to be selectively removed from the arms, said teeth for each fork being integrally mounted on a common bar, each of said bars and forks having mating apertures, and said fastener comprises bolt means extending through the common apertures.

9. The truck of claim 8 wherein each of said forks includes means forming a slot in which the bar is secured by the bolt means.

10. A truck for enabling wooden pallets or the like to be translated comprising a pair of generally horizontally extending, spaced forks, generally upwardly extending arms fixedly secured to the horizontally extending forks, means for enabling said forks and arms to be rotated about a common pivot axis proximate the ends of said arms, wheel means mounted coaxially with said axis, a multiplicity of upwardly extending teeth running along a substantial length of said forks, said teeth being pitched toward said arms and having edges to engage and dig into the lower horizontally extending surface of a pallet as the truck is rotated about the axis in response to a horizontally directed force being applied to said upwardly extending arms, said teeth having a length less than the thickness of boards in the pallet, and fastener means for enabling said teeth to be selectively removed from the arms, said fastener means including pin means for separately securing each of said teeth to said forks.

11. The truck of claim 10 wherein each of said teeth includes a completely contained aperture, apertures on each of said forks mating with apertures in the teeth, and said pin means includes a bolt extending through mating apertures of the teeth and forks.

12. The truck of claim 10 wherein each of said teeth is cylindrical and includes a circular notch in the side wall thereof, each of said forks including a plurality of first bores having generally vertically extending axes for receiving the teeth and restraining them in place, each of said forks including a second plurality of bores each partially intersecting one of the first bores and having horizontally extending axes and said fastener means includes a separate dowel extending through each of the second bores.

13. A truck for enabling wooden pallets or the like to be translated comprising a pair of generally horizontally extending, spaced forks, generally upwardly extending arms fixedly secured to the horizontally extending forks, means for enabling said forks and arms to be rotated about a common pivot axis proximate the ends of said arms, wheel means mounted coaxially with said axis, a multiplicity of upwardly extending teeth running along a substantial length of said forks, said teeth being pitched toward said arms and having edges to engage and dig into the lower horizontally extending surface of a pallet as the truck is rotated about the axis in response to a horizontally directed force being applied to said upwardly extending arms, said teeth having a length less than the thickness of boards in the pallet, and fastener means for enabling said teeth to be selectively removed from the arms, each of said teeth being selectively removable from said bar, and each of said teeth including a gripping surface on different faces thereof.

14. A truck for enabling wooden pallets or the like to be translated comprising a pair of generally horizontally extending, spaced forks, generally upwardly extending arms fixedly secured to the horizontally extending forks, means for enabling said forks and arms to be rotated about a common pivot axis proximate the ends of said arms, wheel means mounted coaxially with said axis, a multiplicity of upwardly extending teeth running along a substantial length of said forks, said teeth being pitched toward said arms and having edges for engaging and digging into the lower horizontally extending surface of a pallet as the truck is rotated about the axis in response to a horizontally directed force being applied to said upwardly extending arms, and a rigidly mounted stop extending between the forks and located approximately at the ends of said teeth, said stop having a vertically extending surface positioned substantially at right angles to the upper surfaces of the forks and to engage a vertical surface of the pallet for preventing movement of the vertical surface into contact with the arms.

* * * * *